(12) United States Patent
Luo et al.

(10) Patent No.: US 11,659,077 B2
(45) Date of Patent: May 23, 2023

(54) MOBILE TERMINAL AND METHOD FOR CONTROLLING THE SAME

(71) Applicant: Kookmin University Industry Academy Cooperation Foundation, Seoul (KR)

(72) Inventors: Tao Luo, Seoul (KR); Yichieh Lee, New Taipei (CN); Haoyue Guo, Seoul (KR); Zhouxiong Jin, Seoul (KR); Jinghong Nan, Seoul (KR); Erica Pellegatta, Milan (IT); Wonheung Jo, Seoul (KR); Ayoung Hwang, Busan (KR); Yaejin Kang, Busan (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 0 days.

(21) Appl. No.: 17/768,651

(22) PCT Filed: Oct. 15, 2020

(86) PCT No.: PCT/KR2020/014120
§ 371 (c)(1),
(2) Date: Apr. 13, 2022

(87) PCT Pub. No.: WO2021/080248
PCT Pub. Date: Apr. 29, 2021

(65) Prior Publication Data
US 2022/0360659 A1    Nov. 10, 2022

(30) Foreign Application Priority Data

Oct. 23, 2019    (KR) .................. 10-2019-0132510

(51) Int. Cl.
*H04W 4/00*        (2018.01)
*H04M 1/72403*     (2021.01)
(Continued)

(52) U.S. Cl.
CPC ...... *H04M 1/72403* (2021.01); *G06F 3/0482* (2013.01); *G06F 3/0486* (2013.01);
(Continued)

(58) Field of Classification Search
CPC ......... H04M 1/72403; H04M 2201/42; H04M 2250/22; G06F 3/0482; G06F 3/0486; G06F 3/04886
See application file for complete search history.

(56) References Cited

U.S. PATENT DOCUMENTS 8,661,340 B2    2/2014    Goldsmith et al.
2010/0313158 A1*   12/2010    Lee .................. G06F 3/04845
                                                               715/764

(Continued)

FOREIGN PATENT DOCUMENTS

KR    10-2009-0028464 A    3/2009
KR    10-2012-0000004 A    1/2012
(Continued)

OTHER PUBLICATIONS

Notification of Reason for Refusal (Korean Intellectual Property Office), for KR 10-2019-0132510, dated Oct. 16, 2020.
(Continued)

*Primary Examiner* — Omoniyi Obayanju
(74) *Attorney, Agent, or Firm* — Sughrue Mion, PLLC

(57) ABSTRACT

Disclosed is a mobile terminal and method for controlling the same. According to an embodiment of the disclosure, a mobile terminal includes a display; a sensing unit; and a controller, wherein the display is configured to display a virtual keyboard and display a content entered by a user using the virtual keyboard on a content input window, wherein the virtual keyboard includes an undo key for canceling a task performed in the content input window and a redo key for restoring a canceled task, and wherein when (Continued)

the sensing unit detects a first drag past a first border line designated on a side of the undo key after a touch on the undo key, the controller is configured to display a first expected change of content expected to be changed and displayed in the content input window to be identified when one of tasks performed in the content input window is to be canceled in a designated unit.

12 Claims, 12 Drawing Sheets

(51) Int. Cl.
  *G06F 9/451* (2018.01)
  *H04M 1/72469* (2021.01)
  *G06F 3/0482* (2013.01)
  *G06F 3/0486* (2013.01)
  *G06F 3/04886* (2022.01)

(52) U.S. Cl.
  CPC .......... *G06F 3/04886* (2013.01); *G06F 9/451* (2018.02); *H04M 1/72469* (2021.01); *H04M 2201/42* (2013.01); *H04M 2250/22* (2013.01)

(56) References Cited

U.S. PATENT DOCUMENTS

2013/0285914 A1  10/2013  Pasquero et al.
2016/0004432 A1*  1/2016  Bernstein .............. G06F 3/0486
                                                      715/769

FOREIGN PATENT DOCUMENTS

KR    10-2014-0098422 A    8/2014
KR    10-2017-0006230 A    1/2017
KR    10-2018-0113965 A    10/2018

OTHER PUBLICATIONS

Notification of Reason for Refusal (Last notification) (Korean Intellectual Property Office), for KR 10-2019-0132510, dated May 24, 2021.
Korean Grant of Patent for KR 10-2019-0132510, dated Aug. 18, 2021.
International Search Report for PCT/KR2020/014120, dated Jan. 22, 2021.

* cited by examiner

MOBILE TERMINAL AND METHOD FOR CONTROLLING THE SAME

CROSS REFERENCE TO RELATED APPLICATIONS

This application is a National Stage of International Application No. PCT/KR2020/014120 filed Oct. 15, 2020, which claims priority under U.S.C. § 119(a) to Korean Patent Application No. 10-2019-0132510 filed Oct. 23, 2019, the contents of which are incorporated herein by reference in their entireties.

TECHNICAL FIELD

The disclosure relates to a mobile terminal and method for controlling the same.

BACKGROUND ART

Functions of mobile terminals are being diversified. For example, there are data and voice communication functions, camera-based photography and videography functions, voice recording functions, functions to play a music file through a speaker system, and functions to output images or videos on a display. For some terminals, an electronic game playing function is added, or a multimedia player function is performed.

Recent mobile terminals in particular may receive multi-cast signals that provide visual content such as broadcast, video, or television programs. With the diversified functions, the terminal is implemented in the form of a multimedia player equipped with complex functions such as photography or videography, music or video file play, gaming, broadcast receiving, etc.

In order to support and enhance the functions of the mobile terminal, improving a structural part and/or a software part of the terminal may be considered.

DESCRIPTION OF EMBODIMENTS

Technical Problem

The disclosure provides a mobile terminal that provides a more convenient and efficient input means by having a virtual keyboard equipped with an undo key and a redo key, and a method for controlling the same.

Solution to Problem

According to an aspect of the disclosure, a mobile terminal comprises a display; a sensing unit; and a controller, wherein the display is configured to display a virtual keyboard and display a content entered by a user using the virtual keyboard on a content input window, wherein the virtual keyboard includes an undo key for canceling a task performed in the content input window and a redo key for restoring a canceled task, and wherein when the sensing unit detects a first drag past a first border line designated on a side of the undo key after a touch on the undo key, the controller is configured to display a first expected change of content expected to be changed and displayed in the content input window to be identified when one of tasks performed in the content input window is to be canceled in a designated unit.

According to an exemplary embodiment, when the sensing unit detects a release of touch subsequent to the first drag, the controller is configured to reflect and display the first expected change of content in the content input window.

According to an exemplary embodiment, when the sensing unit detects a long touch, which is a touch of more than a designated time, subsequent to the first drag, the controller is configured to control the display to display a designated undo extension menu, and the undo extension menu comprises a plurality of numbers of tasks to be canceled.

According to an exemplary embodiment, when the sensing unit additionally detects a second drag to select the number of tasks after the long touch, the controller is configured to select a certain number of tasks in the undo extension menu according to a displacement to the second drag after the long touch, control the display to display the selected number of tasks to be identified, and display a second expected change of content expected to be changed and displayed in the content input window to be identified when the selected number of tasks are canceled in a designated unit.

According to an exemplary embodiment, when the sensing unit detects a release of touch subsequent to the second drag, the controller is configured to reflect and display the second expected change of content in the content input window.

According to an exemplary embodiment, when the sensing unit detects a third drag past the first border line or a designated second border line when dragging is performed toward the undo key from a current touching point, the controller is configured to delete the first expected change of content from the content input window and display a content input window as before displaying the expected change of content.

According to an exemplary embodiment, when the sensing unit detects a fourth drag past a fourth border line designated on a side of the redo key subsequent to a touch on the redo key, the controller is configured to display a fourth expected change of content expected to be changed and displayed in the content input window to be identified when one of canceling tasks is to be restored.

According to an exemplary embodiment, when the sensing unit detects a release of touch after the fourth drag, the controller is configured to reflect and display the fourth expected change of content in the content input window.

According to an exemplary embodiment, the controller is configured to establish areas extending by respectively designated distances from the undo key and the redo key as an undo key area and a redo key area, respectively, and when the sensing unit detects a touch in each of the areas, the controller is configured to determine that a touch of a key corresponding to the touch area has occurred.

According to an aspect of the disclosure, a method for controlling a mobile terminal, the method comprising: (a) displaying a virtual keyboard on a display of the mobile terminal, and displaying a content entered by a user using the virtual keyboard in a content input window, wherein the virtual keyboard comprises an undo key for canceling a task performed in the content input window and a redo key for restoring a canceled task; (b) when a sensing unit detects a first drag past a first border line designated on a side of the undo key subsequent to a touch on the undo key, displaying, by a controller, a first expected change of content expected to be changed and displayed in the content input window to be identified when one of tasks performed in the content input window is to be canceled in a designated unit; and (c) when a release of touch is detected after the first drag, reflecting and displaying the first expected change of content in the content input window.

According to an exemplary embodiment, the step (b) comprises (b1) controlling the display to display a designated undo extension menu when a long touch, which is a touch of more than a designated time, is detected after the first drag, and the undo extension menu comprises a plurality of numbers of tasks to be canceled.

According to an exemplary embodiment, the step (b1) is followed by (b2) when a second drag to select a number of the tasks is additionally detected after the long touch, selecting a certain number of tasks in the undo extension menu according to a displacement to the second drag after the long touch, controlling the display to display the selected number of tasks to be identified, and displaying a second expected change of content expected to be changed and displayed in the content input window to be identified when the selected number of tasks are to be canceled in a designated unit.

According to an exemplary embodiment, the step (b2) is followed by (b3) when a third drag past the first border line or a designated second border line is detected when dragging is performed toward the undo key from a current touching point, deleting the second expected change of content from the content input window and displaying a content input window as before displaying the second expected change of content.

According to an exemplary embodiment, the method further comprising (d) when a fourth drag past a fourth border line designated on a side of the redo key is detected after a touch on the redo key, displaying a fourth expected change of content expected to be changed and displayed in the content input window to be identified when one of canceled tasks performed in the content input window is to be restored.

According to an exemplary embodiment, the step (d) comprises when a release of touch is detected after the fourth drag, reflecting and displaying the fourth expected change of content in the content input window.

According to an aspect of the disclosure, a non-transitory computer readable medium recording a program which performs the above-mentioned method for controlling the mobile terminal.

Advantageous Effects of Disclosure

According to a mobile terminal and method for controlling the same in embodiments of the disclosure, a more convenient and efficient input means may be provided by having a virtual keyboard equipped with an undo key and a redo key.

BEST MODE

Various modifications may be made to embodiments of the disclosure, which will be described more fully hereinafter with reference to the accompanying drawings. The disclosure should be understood as not limited to particular embodiments but including all the modifications, equivalents and replacements which belong to technical scope and ideas of the disclosure.

Some related well-known technologies that possibly obscure the disclosure will not be described. Ordinal numbers (e.g., first, second, etc.) as herein used are to distinguish components from one another.

Throughout the specification, the term "connected" or "coupled" should be interpreted that a component is directly connected or coupled to another component. However, unless otherwise stated, it is also understood that the component may be indirectly connected or coupled to the other component via a third component.

Furthermore, throughout the specification, the term "include (or including)" or "comprise (or comprising)" is inclusive or open-ended and does not exclude additional, unrecited components, elements or method steps, unless otherwise stated. The terms "unit", "module", or the like as herein used each represent a unit for handling at least one function or operation, and may be implemented in hardware, software, or a combination thereof.

Embodiments of the disclosure will now be described in detail with reference to accompanying drawings.

A mobile terminal as described in this specification may include a cell phone, a smart phone, a laptop computer, a terminal for digital broadcasting, a personal digital assistant (PDA), a portable multimedia player (PMP), a navigation, a slate personal computer (slate PC), a tablet PC, an ultrabook, a wearable device (e.g., a smart watch, a smart glass, a head mounted display (HMD), etc.), etc.

Those of ordinary skill in the art may understand that configurations according to embodiments of the disclosure as described herein will not be exclusively applied to the mobile terminal but equally applied to a fixed terminal such as a digital television (digital TV), a desktop computer, a digital signage, etc., except for a case that the configurations are only applicable to the mobile terminal.

Figure 1:
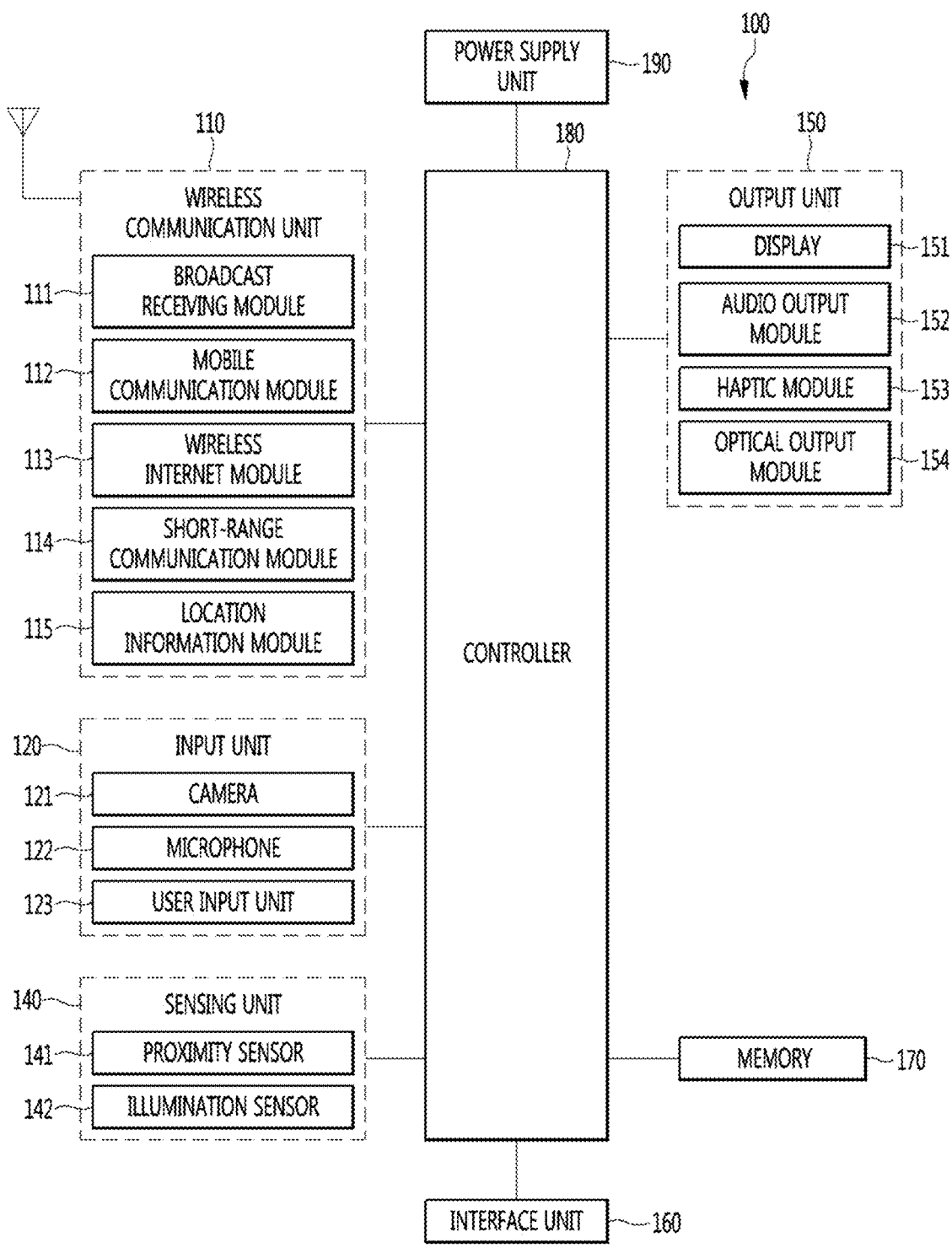
FIG. 1 is a block diagram for describing a mobile terminal, according to an embodiment of the disclosure.

FIG. 1 is a block diagram for describing a mobile terminal related to an embodiment of the disclosure.

A mobile terminal 100 may include a wireless communication unit 110, an input unit 120, a sensing unit 140, an output unit 150, an interface unit 160, a memory 170, a controller 180, and a power supply unit 190. The components shown in FIG. 1 are not essential to implement the mobile terminal, so the mobile terminal as described herein may include more or fewer components than the aforementioned components.

Specifically, of the components, the wireless communication unit 110 may include one or more modules which enable wireless communication between the mobile terminal 100 and a wireless communication system, between the mobile terminal 100 and another mobile terminal 100, or between the mobile terminal 100 and an external server. Furthermore, the wireless communication unit 110 may include one or more modules for connecting the mobile terminal 100 to one or more networks.

The wireless communication unit 110 may include at least one of a broadcast receiver module 111, a mobile communication module 112, a wireless Internet module 113, a short-range communication module 114, and a location information module 115.

The input unit 120 may include a camera 121 or an image input for inputting an image signal, a microphone 122 or an audio input for inputting an audio signal, and a user input unit 123 for receiving information from the user. Voice data or image data collected from the input unit 120 may be analyzed and processed under a control command from the user.

The user input unit 123 is for receiving information from the user, and when information is entered through the user input unit 123, the controller 180 may control an operation of the mobile terminal 100 to correspond to the input information. The user input unit 123 may include a mechanical input means (or mechanical keys, e.g., buttons, dome switches, a jog wheel, a jog switch, etc., located on the front or rear or side surface of the mobile terminal 100) and a touch-type input means. For example, the touch-type input means may be comprised of virtual keys, soft keys, or visual keys displayed on a touch screen by software processing, or touch keys arranged in a portion other than the touch screen. The virtual key or visual key may be arranged on the touch screen in various forms, and may be comprised of a graphic, text, an icon, a video, or a combination thereof.

The sensing unit 140 may include one or more sensors for detecting at least one of information in the mobile terminal, information about a surrounding environment around the mobile terminal and user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared (IR) sensor, a finger scan sensor, an ultrasonic sensor, an optical sensor (e.g., see the camera 121), a microphone (see the microphone 122), a battery gauge, an environment sensor (e.g., a barometer, a hygrometer, a thermometer, a radioactivity detection sensor, a heat detection sensor, a gas detection sensor, etc.), and a chemical sensor (e.g., an electronic nose, a health care sensor, a biometric sensor, etc.). The mobile terminal as disclosed in this specification may combine and use information items detected by at least two of the sensors.

The sensing unit 140 detects at least one of information in the mobile terminal, information about a surrounding environment around the mobile terminal and user information, and generates a corresponding sensing signal. Based on the sensing signal, the controller 180 may control driving or operation of the mobile terminal 100 or perform data processing, a function or an operation related to an application program installed in the mobile terminal 100. Of the various sensors that may be included in the sensing unit 140, typical sensors will be examined in detail.

First, the proximity sensor 141 refers to a sensor that detects an object getting closer to a certain detecting surface or whether there is an object near the detecting surface by using power of an electromagnetic field, infrared, or the like, without mechanical contact. The proximity sensor 141 may be arranged in an internal area of the mobile terminal, which is enclosed by the touch screen as examined above, or in the vicinity of the touch screen.

As an example of the proximity sensor 141, there may be a transmissive photoelectric sensor, a direct reflection photoelectric sensor, a mirror reflection photoelectric sensor, a high-frequency oscillation type proximity sensor, a capacitive proximity sensor, an infrared proximity sensor, etc. In a case that the touch screen is capacitive, the proximity sensor 141 may be configured to detect approaching of a conductive object based on a change in electric field caused by the approaching of the object. In this case, the touch screen (or touch sensor) itself may be classified as the proximity sensor.

In the meantime, for convenience of explanation, an action of an object approaching the touch screen without contacting the touch screen and allowing itself to be recognized as being positioned on the touch screen is called a "proximity touch", and an action of an object making actual contact with the touch screen is called a "contact touch". The position of the proximity touch of the object on the touch screen refers to a position on the touch screen vertically corresponding to the object when the object makes the proximity touch. The proximity sensor 141 may detect a proximity touch and a proximity touch pattern (e.g., a proximity touch distance, a proximity touch direction, a proximity touch speed, a proximity touch time, a proximity touch position, a proximity touch motion state, etc.). The controller 180 may process data (or information) corresponding to the proximity touch motion and the proximity touch pattern detected through the proximity sensor 141 as described above, and may further output visual information corresponding to the processed data on the touch screen. Furthermore, the controller 180 may control the mobile terminal 100 to process different operations or data (or information) according to whether the touch at a point on the touch screen is the proximity touch or the contact touch.

The touch sensor detects a touch (or a touch input) made on the touch screen (or the display 151) using at least one of many touch methods such as a resistive film method, a capacitive method, an IR method, an ultrasonic method, a magnetic field method, etc.

For example, the touch sensor may be configured to convert a change in pressure applied on a certain portion of the touch screen or capacitance occurring in the certain portion into an electrical input signal. The touch sensor may be configured to detect a position, an area, pressure, capacitance, etc., when a touching object that makes a touch on the touch screen touches the touch sensor. The touching object is an object making a touch on the touch sensor, which may be, for example, a finger, a touch pen or a stylus pen, a pointer, etc.

As such, when there is a touch input to the touch sensor, the corresponding signal(s) is sent to a touch controller. The touch controller processes the signal(s) and sends corresponding data to the controller 180. Accordingly, the controller 180 may know which area of the display 151 has been touched. The touch controller may be a separate component from the controller 180 or may be the controller 180 itself.

The controller 180 may perform different or same control depending on the type of the touching object that makes touch on the touch screen (or a touch key included in addition to the touch screen). Whether to perform the different control or the same control depending on the type of the touching object may be determined according to a current operation state of the mobile terminal 100 or a currently running application program.

The touch sensor and the proximity sensor as examined above may detect various types of touches such as a short (or tap) touch, a long touch, a multi-touch, a drag touch, a flick touch, a pinch-in touch, a pinch-out touch, a swipe touch, a hovering touch, etc. on the touch screen, independently or in combination.

The output unit 150 may generate a visual, audible, or tactile output, and include at least one of a display 151, a audio output module 152, a haptic module 153, and an optical output module 154. The display 151 may implement a touch screen by forming a mutual layer structure with the touch sensor or being integrally formed with the touch sensor. The touch screen may serve as the user input unit 123 that provides an input interface between the mobile terminal 100 and also provide an output interface between the mobile terminal 100 and the user.

The display 151 displays (outputs) information processed in the mobile terminal 100. For example, the display 151 may display execution screen information for an application program running in the mobile terminal 100, or user interface (UI) or graphic user interface (GUI) information according to the execution screen information.

The interface unit 160 serves as a passage to various types of external devices connected to the mobile terminal 100. The interface unit 160 may include at least one of a wired/wireless headset port, an external charger port, a wired/wireless data port, a memory card port, a port connected to a device equipped with an identification module, an audio input/output (I/O) port, a video I/O port, and an earphone port. In response to connection of an external device to the interface unit 160, the mobile terminal 100 may perform suitable control related to the connected external device.

Furthermore, the memory 170 stores data that supports various functions of the mobile terminal 100. The memory 170 may store many application programs or applications that run in the mobile terminal 100, data or instructions for operating the mobile terminal 100. At least some of the application programs may be downloaded from an external server through wireless communication. Furthermore, at least some of the application programs may exist in the mobile terminal 100 from the time of the release date for default functions (e.g., call receiving and sending functions, and message receiving and sending functions) of the mobile terminal 100. The application program may be stored in the memory 170, installed in the mobile terminal 100 and operated by the controller 180 to perform an operation (or function) of the mobile terminal.

The controller 180 typically controls general operation of the mobile terminal 100 in addition to the application program related operation. The controller 180 may provide or process suitable information or function for the user by processing a signal, data, information, etc., input or output through the aforementioned components or operating an application program stored in the memory 170.

In addition, the controller 180 may control at least some of the components shown in FIG. 1 to operate an application program stored in the memory 170. Furthermore, the controller 180 may operate at least two or more of the components included in the mobile terminal 100 by combining them to operate the application program.

The power supply unit 190 is supplied with external power or internal power and supplies the power to the respective components included in the mobile terminal 100, under the control of the controller 180. The power supply unit 190 may include a battery, which may be an embedded battery or a replaceable battery.

At least some of the components may operate in cooperation with each other to implement an operation, control, or a control method of the mobile terminal according to various embodiments, which will be described below. Furthermore, the operation, control, or control method of the mobile terminal may be implemented in the mobile terminal by running at least one application program stored in the memory 170.

The following various embodiments may be implemented in a compute- or similar device-readable recording medium using e.g., software, hardware, or a combination thereof.

A general internal configuration of the mobile terminal according to embodiments of the disclosure has thus far been described with reference to FIG. 1. In describing a mobile terminal according to an embodiment of the disclosure with reference to FIG. 2, components related to the embodiment of the disclosure will be focused, but it is obvious to those of ordinary skill in the art that one or more components of the internal configuration of FIG. 1 may be included in view of technical ideas of the disclosure.

Figure 2:
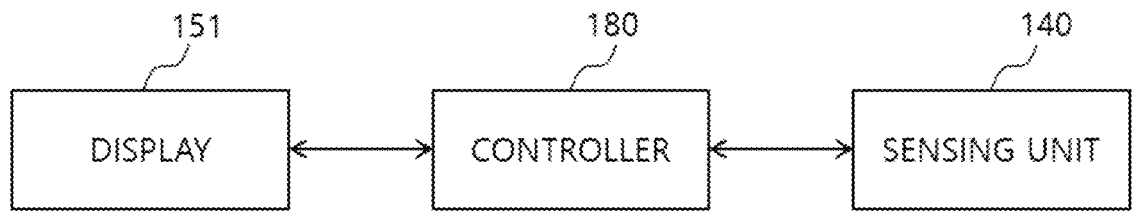
FIG. 2 is a block diagram illustrating an internal configuration of a mobile terminal, according to an embodiment of the disclosure.

FIG. 2 is a block diagram illustrating an internal configuration of a mobile terminal, according to an embodiment of the disclosure.

Referring to FIG. 2, a mobile terminal according to an embodiment of the disclosure may include the display 151, the sensing unit 140, and the controller 180.

General functions that may be executed by the display 151, the sensing unit 140 and the controller 180 in the mobile terminal 100 are described above in detail with reference to FIG. 1, so the overlapping description will not be repeated.

In the mobile terminal 100 according to an embodiment of the disclosure, the display 151 may display a certain virtual keyboard and a content entered by the user using the virtual keyboard in a certain content input window. The virtual keyboard may include an undo key for canceling a task performed in the content input window and a redo key for restoring a canceled task. When the sensing unit 140 detects a first drag past a first border line designated on a side of the undo key after a touch on the undo key, the controller 180 may display a first expected change of content expected to be changed and displayed in the content input window to be identified when one of tasks performed in the content input window is to be canceled in a designated unit.

This will now be described in detail with reference to FIGS. 3 to 10.

The main configuration in the mobile terminal 100 may be variously changed in such a manner that one of the components of the internal configuration of the mobile terminal 100 as described above with reference to FIGS. 1 and 2 is divided into several components, or several components are merged into one component, and a method for controlling the mobile terminal 100 according to an embodiment of the disclosure will now be described by considering the mobile device 100 as an entity for performing the respective steps.

Although the mobile terminal 100 is taken as an example of an entity for performing the respective steps of the following method for controlling the mobile terminal 100, it is merely for convenience of explanation and it is obvious to those of ordinary skill in the art that the controller 180, for example, as described above, may be the entity for the respective steps in view of technical ideas of the disclosure.

Figure 3:
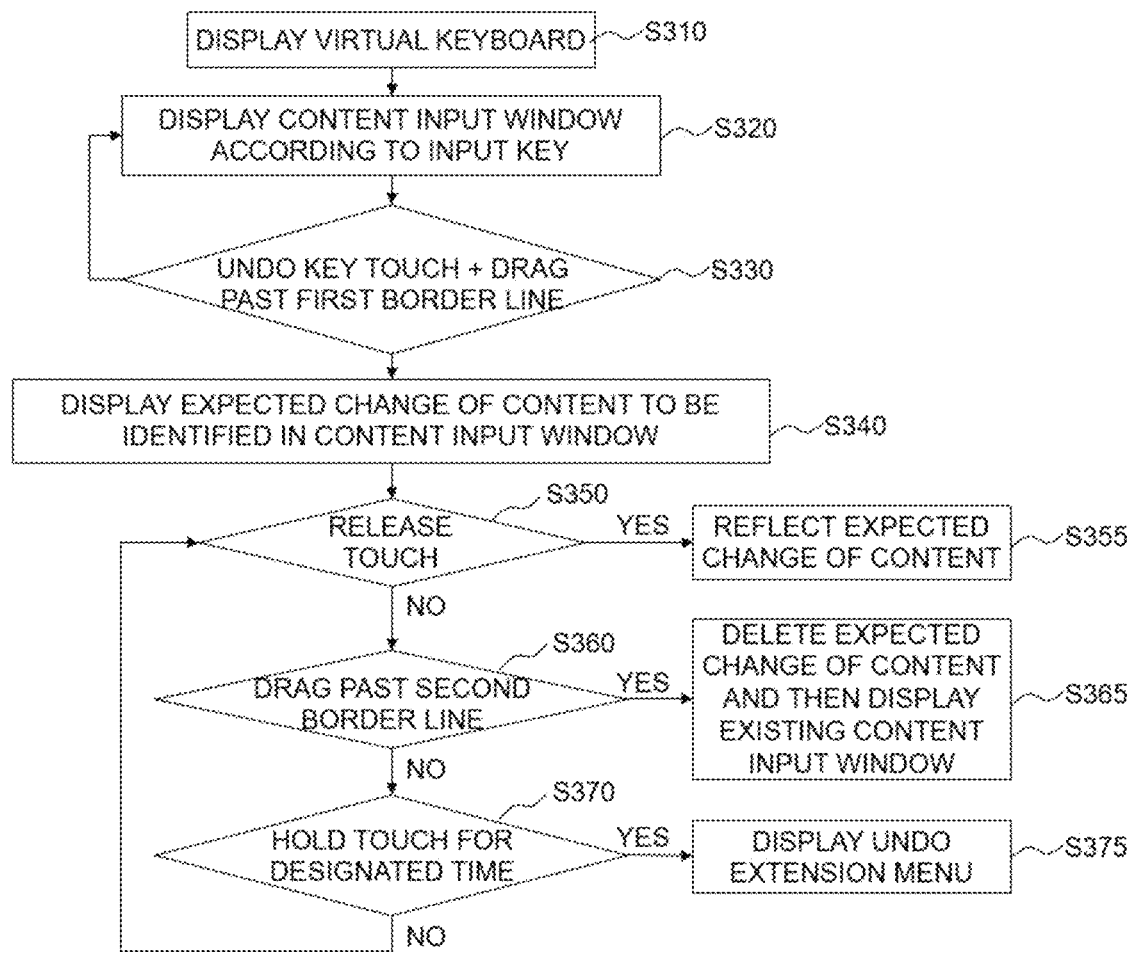
FIG. 3 is a flowchart for describing a method for controlling a mobile terminal, according to an embodiment of the disclosure.
Figure 4:
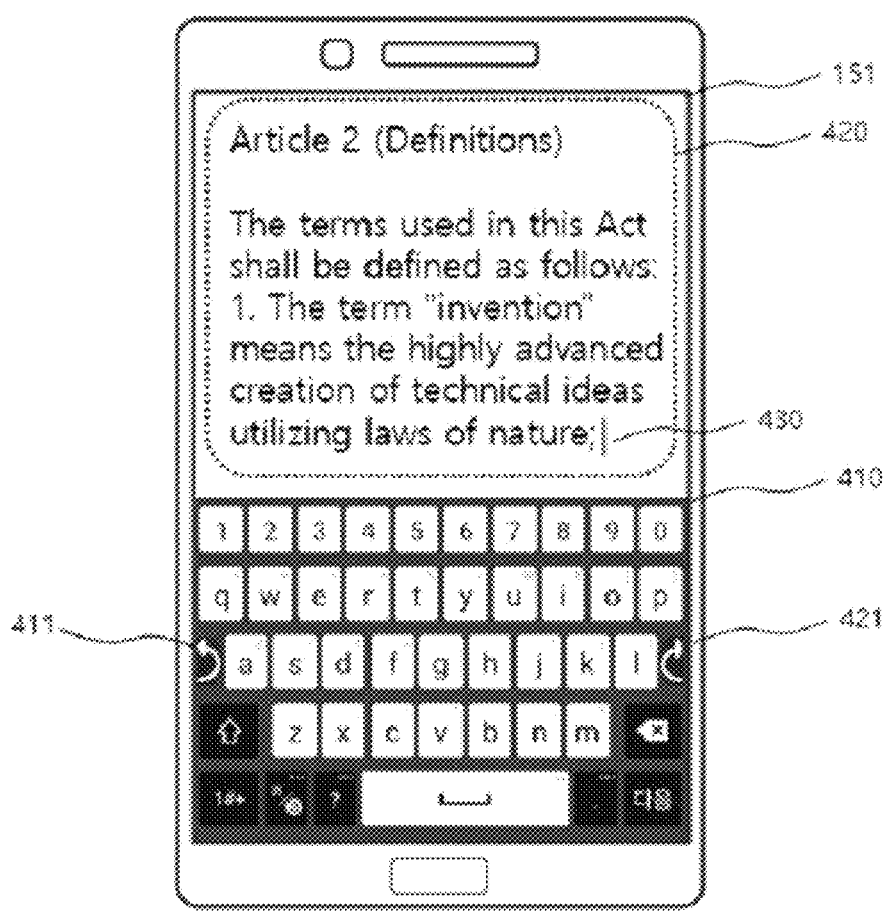
FIG. 4 illustrates a content input window and a virtual keyboard displayed by a mobile terminal, according to an embodiment of the disclosure.
Figure 5:
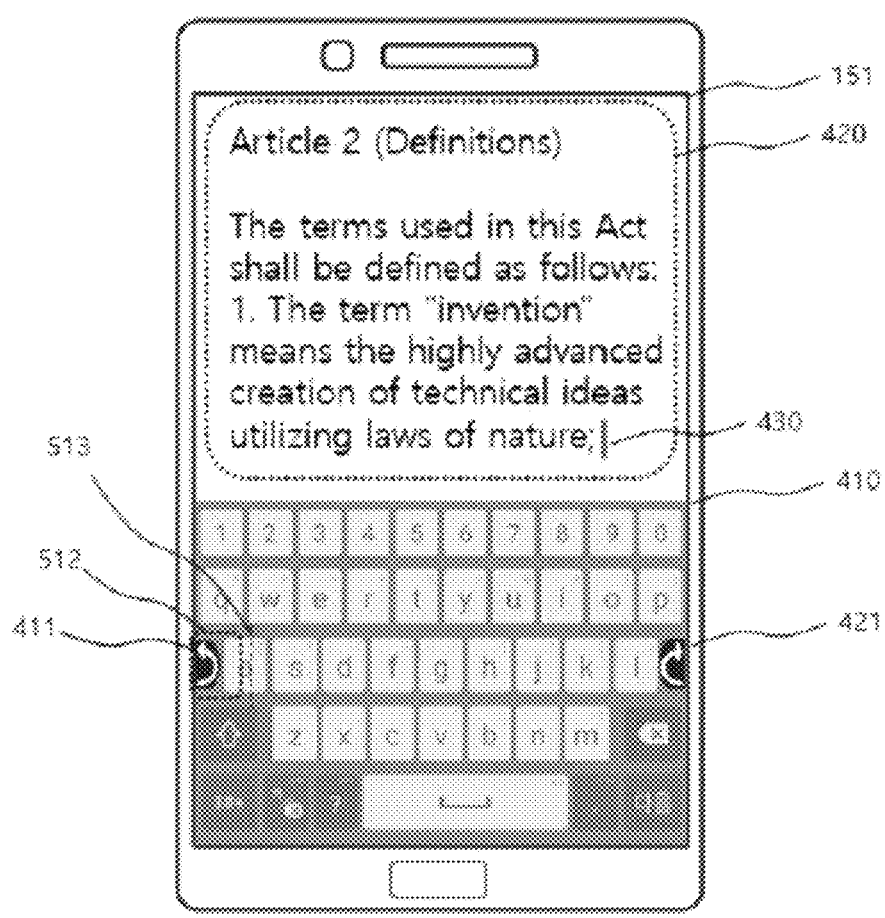
FIGS. 5 and 6 are diagrams for describing a procedure in which touch and drag is performed for an undo key, according to an embodiment of the disclosure.
Figure 6:
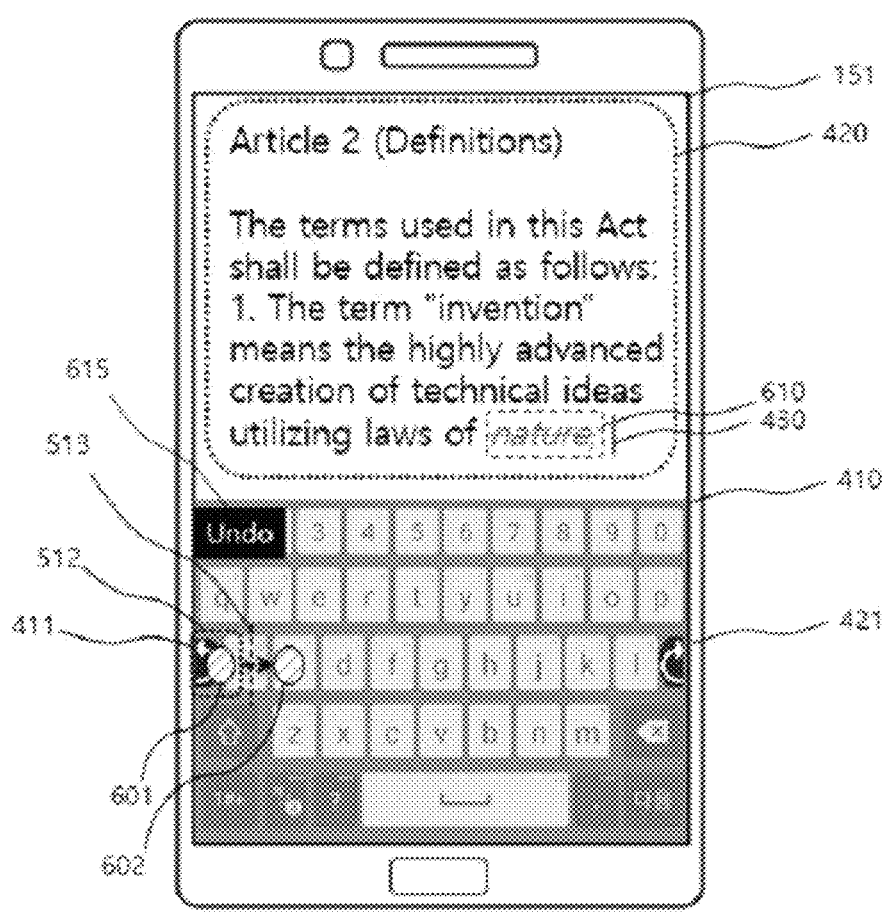
Figure 7:
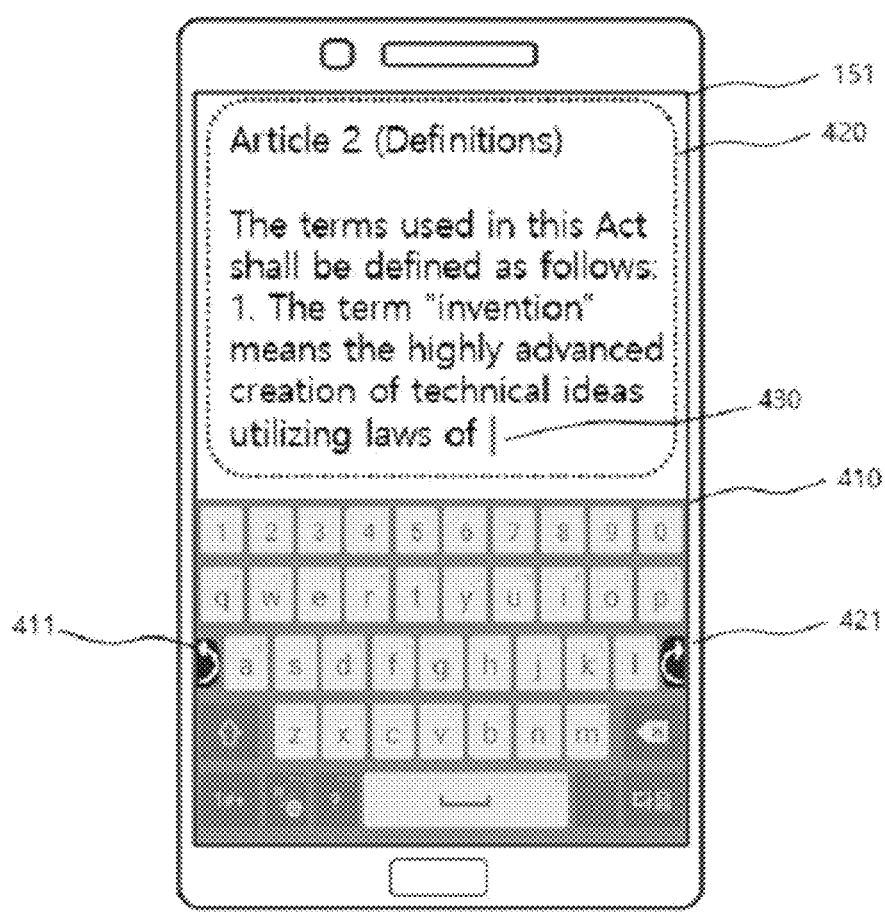
FIG. 7 illustrates an example in which a mobile terminal reflects and displays a first expected change of content in a content input window, according to an embodiment of the disclosure.
Figure 8:
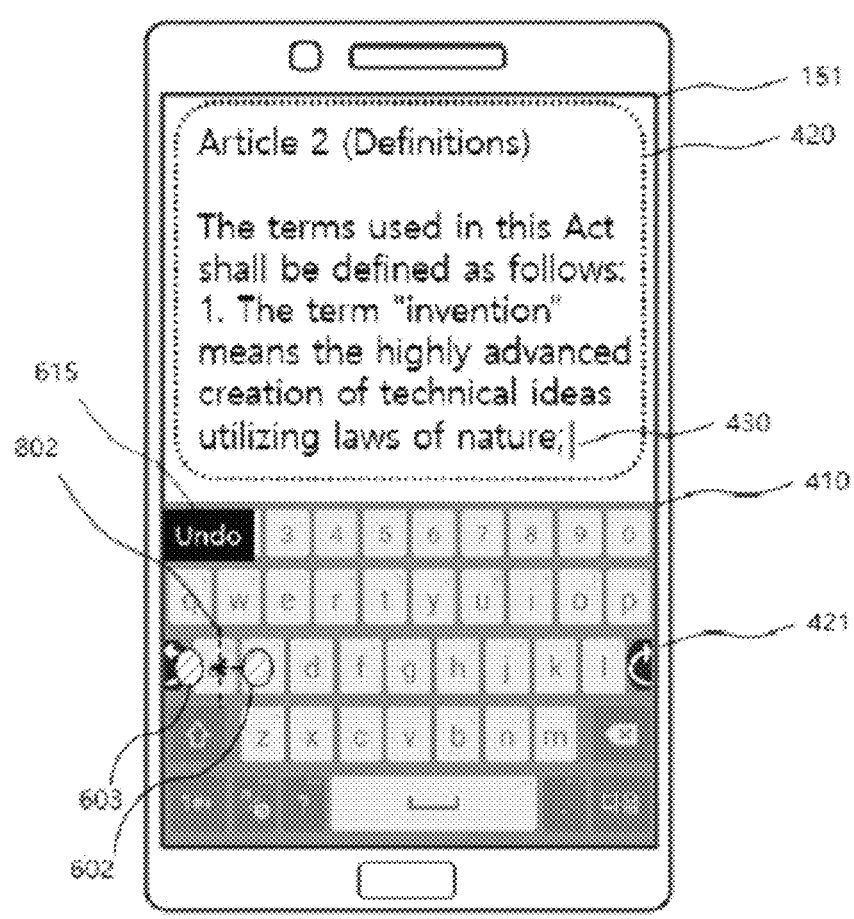
FIG. 8 illustrates an example in which a mobile terminal deletes an expected change of content and displays a previous content input window as before displaying the expected change of content, according to an embodiment of the disclosure.

FIG. 3 is a flowchart for describing a method for controlling the mobile terminal 100, according to an embodiment of the disclosure, FIG. 4 illustrates a content input window and a virtual keyboard displayed by the mobile terminal 100, according to an embodiment of the disclosure, FIGS. 5 and 6 are diagrams for describing a procedure in which touch and drag is performed for an undo key, according to an embodiment of the disclosure, FIG. 7 illustrates an example in which the mobile terminal 100 reflects and displays a first expected change of content in a content input window, according to an embodiment of the disclosure, and FIG. 8 illustrates an example in which the mobile terminal 100 deletes an expected change of content and displays a previous content input window as before displaying the expected change of content, according to an embodiment of the disclosure.

In the following description, FIG. 3 will be referred to as a main drawing and other drawings related to the respective steps will be additionally referred to as needed.

Referring to FIGS. 3 and 4, a method for controlling the mobile terminal 100 according to an embodiment of the disclosure may include the mobile terminal 100 displaying a certain virtual keyboard 410 on the display 151 included in the mobile terminal 100 in step S310, and the mobile terminal 100 displaying a content entered by the user using the virtual keyboard 410 in a certain content input window 420 on the display 151 in step S312.

Reference numeral 430 indicates a cursor, which may be displayed at a point waiting for an input from a user' final input point in the content input window 420, but may also be displayed at a corresponding touch point when the user separately touches a start point or an end point of a content to be deleted from the content input window 420.

The virtual keyboard 410 and the content input window 420 illustrated in FIG. 4 may have various forms depending on the type of the mobile terminal 100 or an application or app used in the mobile terminal 100, which is a well-known technology at the time of filing of the disclosure, so the description thereof will be omitted.

The virtual keyboard according to an embodiment of the disclosure may include an undo key 411 for canceling a task performed in the content input window 420 and a redo key 421 for restoring a canceled task. The undo key 411 and the redo key 421 will be described later in detail with reference to FIGS. 5, 6, 12 and 13.

There may be various tasks performed in the content input window 420 depending on various applications of apps well-known to the public at the time of filing the disclosure. For example, for a note pad, text may be input or deleted, a form may be designated, and a link may be inserted; and for a photo related application, various effects may be designated and a memo may be inserted for a photo.

For convenience of explanation, the following description has the content input window 420 for a note pad and a task performed in the content input window 420 for inserting and deleting text, but the disclosure is not limited thereto.

Referring to FIGS. 3 to 6, when the mobile terminal 100 detects a first drag past a first border line 513 designated on one side of the undo key 411 to a second point 602 after a touch 601 on the undo key 411 in step S330 of FIG. 3, the mobile terminal 100 may proceed to step S340 to display a first expected change of content 610 expected to be changed and displayed to be identified when a task is canceled in a designated unit.

Unlike in FIG. 4, in the drawings since FIG. 5, other keys than the undo key 411 and the redo key 421 in the virtual keyboard 410 are shadowed. The shadowing is to promote understanding the disclosure and facilitate convenience of explanation, but may be applied in the method for controlling the mobile terminal 100 depending on the surroundings to which the disclosure is applied.

Referring to FIG. 5, the virtual keyboard 411 according to an embodiment of the disclosure may have the undo key 411 placed on the left of A key and the redo key 421 placed on the right of L key in the known Qwerty keyboard, but it is merely an example and the keys may be placed at various positions on the virtual keyboard depending on the country's language environment.

In an embodiment of the disclosure, as the undo key 411 and the redo key 421 are arranged on the virtual keyboard 410 by utilizing empty space without significantly changing the existing well-known virtual keyboard, the undo key 411 and the redo key 421 may have a little smaller in size than the other keys.

Accordingly, in an embodiment of the disclosure, the mobile terminal 100 may establish areas extending by respectively designated distances from the undo key 411 and the redo key 421 as an area of the undo key 411 and an area of the redo key 412, respectively, and when detecting a touch in each of the areas, the mobile terminal 100 may determine that a touch on a key corresponding to the touched area has been made.

Figure 12:
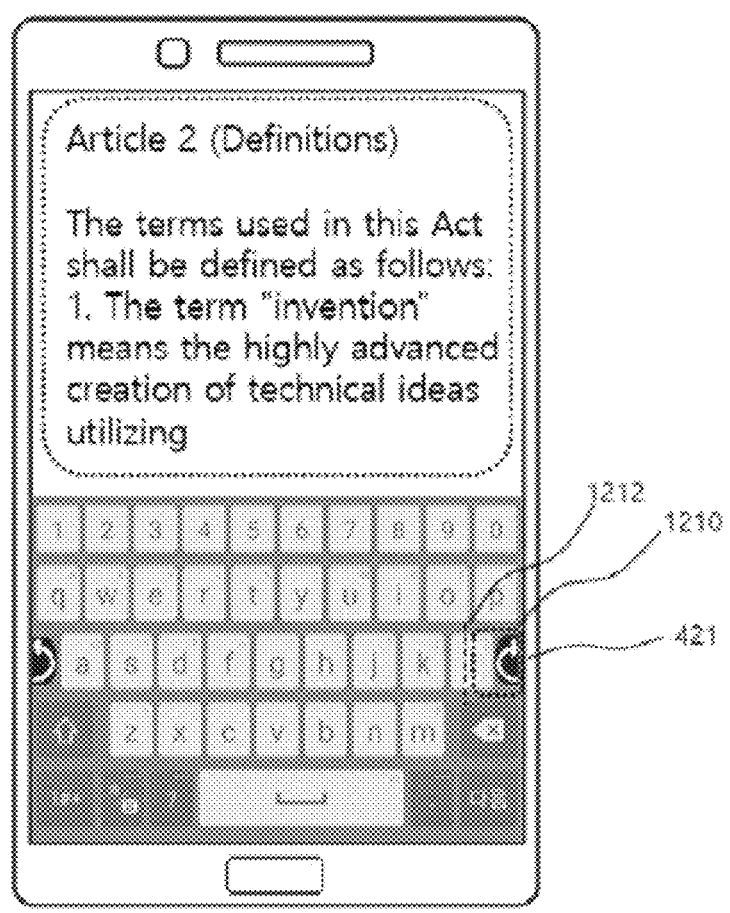
FIGS. 12 and 13 are diagrams for describing a case that a mobile terminal detects touch and drag for a redo key, according to an embodiment of the disclosure.
Figure 13:
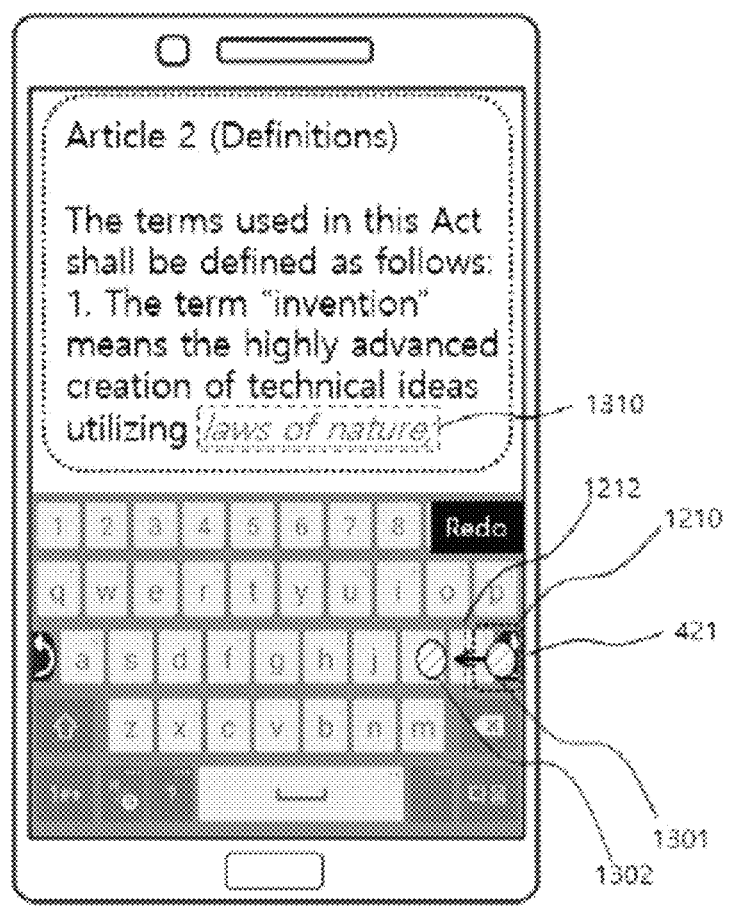

The area of the undo key 411 extending by a designated distance from the undo key 411 is illustrated in FIG. 5, which may be equally applied to the redo key 421 as illustrated in FIGS. 12 and 13, and the designated distance may be a default distance designated in advance or may be designated by the user through a certain UI according to the user's preference.

For understanding of the disclosure and convenience of the explanation, it is assumed that certain text has been entered to the content input window 420 as shown in FIG. 5.

In an embodiment of the disclosure, the designated unit is assumed to be a word, but may be variously designated to be, for example, for Korean alphabet, a consonant, a phoneme, a letter, a line, or the like, and it is obvious to those of ordinary skill in the art that the designated unit may be variously defined depending on the language environment.

Referring to FIG. 6, when the mobile terminal 100 detects the first touch 601 in an undo key area 512 and then detects the first drag, which is a drag past the first border line 513 designated on one side of the undo key 411 to the second point 602 (i.e., in step S330 of FIG. 3), the mobile terminal 100 may display the first expected change of content 610 expected to be changed and displayed in the content input window 420 to be identified when a task is to be canceled in the designated unit in the content input window 420.

In FIG. 6, it is assumed that the designated unit is a word and that tasks previously performed in the content input window 420 are inputting tasks, and the mobile terminal 100 may display the first expected change of content 610 in a different text form indicating that 'nature' is expected to be deleted for the user. The different text form of the expected change of content in the mobile terminal 100 may include many different forms in addition to what is shown in FIG. 6, and it is obvious to those of ordinary skill in the art that the different text form may be designated in various ways depending on the type of application or app to which the content input window 420 belongs.

Furthermore, as indicated by reference numeral 615, when the mobile terminal 100 detects the first touch 601 in the undo key area 512 and then detects the drag past the first border line 513 designated on one side of the undo key 411 to the second point 602 (i.e., in step S330 of FIG. 3), the mobile terminal 100 is expected to perform a certain task related to the undo key 411, and may display an instruction about this for the user. According to an embodiment, the undo key 411 and an icon 615 may be displayed in a form connected to each other to indicate that they are related to each other.

Turning back to FIGS. 3 and 7, when the mobile terminal 100 detects a release of touch after the first drag in step S350, the mobile terminal 100 proceeds to step S355 to reflect and display the first expected change of content 610 in the content input window 420.

FIG. 8 illustrates an example in which the mobile terminal 100 deletes an expected change of content and displays a previous content input window as before displaying the expected change of content, according to an embodiment of the disclosure.

Turning back to FIGS. 3 and 8, when dragging is performed toward the undo key 411 from a current touch point 602 and the mobile terminal 100 detects a third drag past a designated second border line 802 to an arbitrary point 603 in step S360, the mobile terminal 100 proceeds to step S365 to delete the first expected change of content 610 in the content input window 420 and display the content input window 420 as before displaying the first expected change of content 610. The second border line 802 may be given by being designated in advance around the undo key 411, or may be the first border line 513 as designated earlier, or may be variously designated in a manner that the user designates the first border line 513 as described above.

Turning back to FIG. 3, when the mobile terminal 100 detects a long touch, which is a touch of more than a designated time at the second point 602 after the first drag, the mobile terminal 100 proceeds to step S375 to control the display 151 to display a designated undo extension menu. This will now be described with reference to FIGS. 9 and 10.

Figure 9:
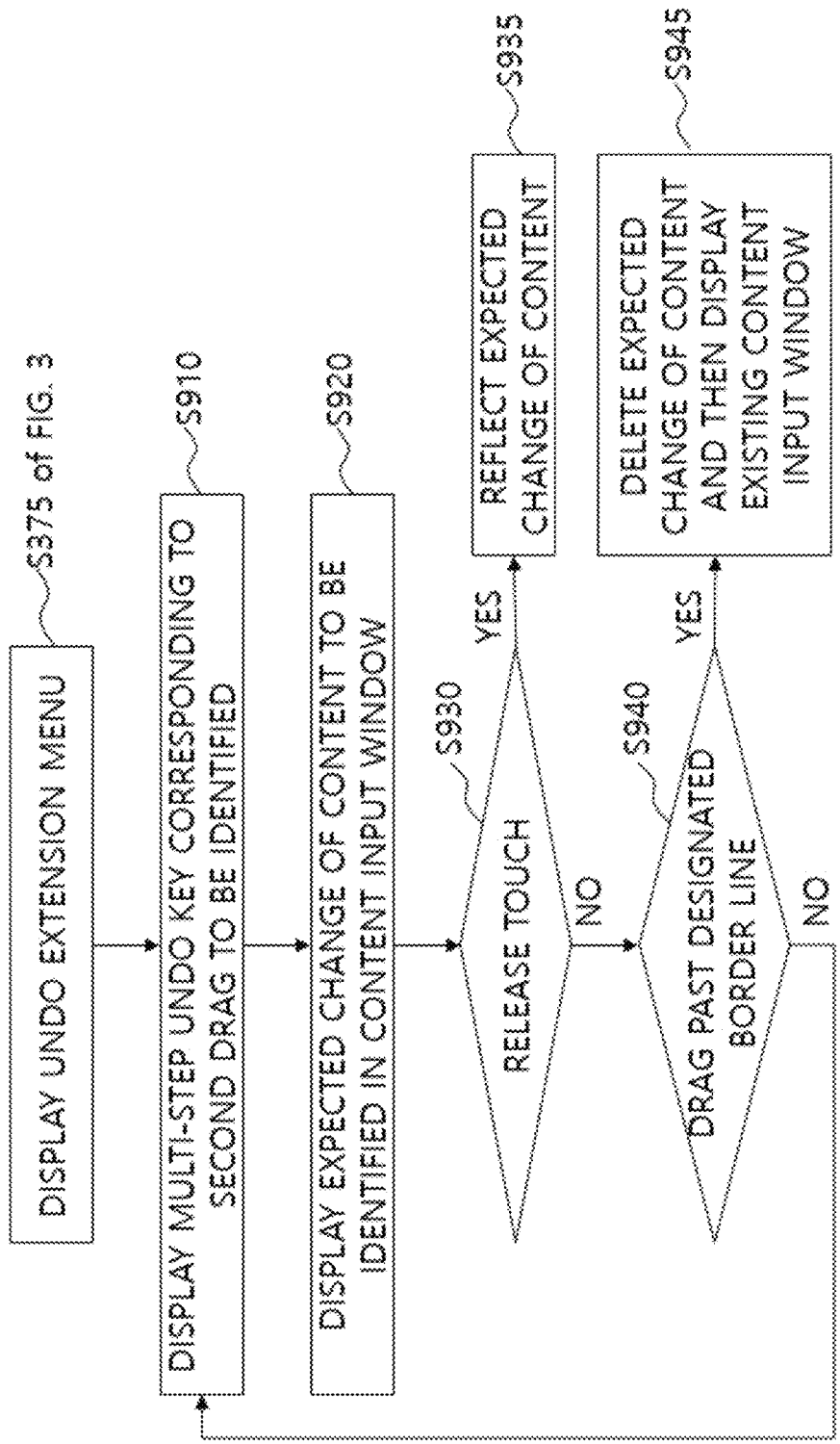
FIG. 9 is a flowchart illustrating a method for controlling a mobile terminal in a case that the mobile terminal displays an undo extension menu, according to an embodiment of the disclosure.
Figure 10:
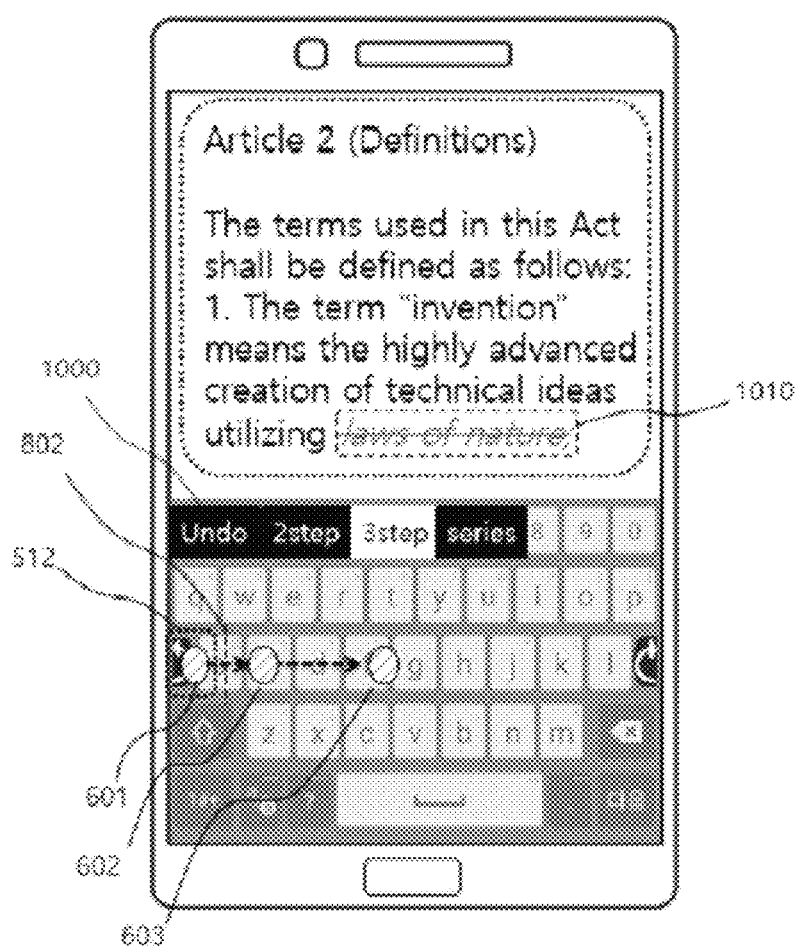
FIG. 10 illustrates a case that a mobile terminal displays an undo extension menu.

FIG. 9 is a flowchart illustrating a method for controlling the mobile terminal 100 in a case that the mobile terminal 100 displays an undo extension menu, according to an embodiment of the disclosure, and FIG. 10 illustrates a case that the mobile terminal 100 displays the undo extension menu.

In an embodiment of the disclosure, an undo extension menu 1000 may include a plurality of numbers of tasks to be canceled as shown in FIG. 10, which may be, for example, two ('2 step'), three ('3 step'), and a series (a row) and hereinafter, may be referred to as 'multi-step undo keys'.

As shown in FIG. 10, when the mobile terminal 100 additionally detects a second drag from the second point 602 to a third point 603, the mobile terminal 100 may select '3 step' among the plurality of multi-step undo keys included in the undo extension menu 1000 according to a displacement of the detected second drag, and control the display 151 to display the selected '3 step' to be identified.

How the mobile terminal 100 selects one of the plurality of multi-step undo keys included in the undo extension menu 1000 according to a displacement of the second drag input by the user may use various methods well known to the public at the date of filing the disclosure, so the detailed description thereof will be omitted.

Subsequently, in step S920 of FIG. 9, as the designated unit is a word and the selected multi-step undo key is the '3 step' as mentioned above, the mobile terminal 100 may display a second expected change of content 1010 expected to be changed and displayed when three tasks are to be canceled in the content input window to be identified in the content input window.

Subsequent steps S930 to S945 are the same as the steps S350 to S365 of FIG. 3 as described above, so the overlapping description will not be repeated.

Of the method for controlling the mobile terminal according to the embodiment of the disclosure, the undo key 411 related description has thus far been provided with reference to FIGS. 3 to 10. In the following description, the redo key 421 will be focused.

Figure 11:
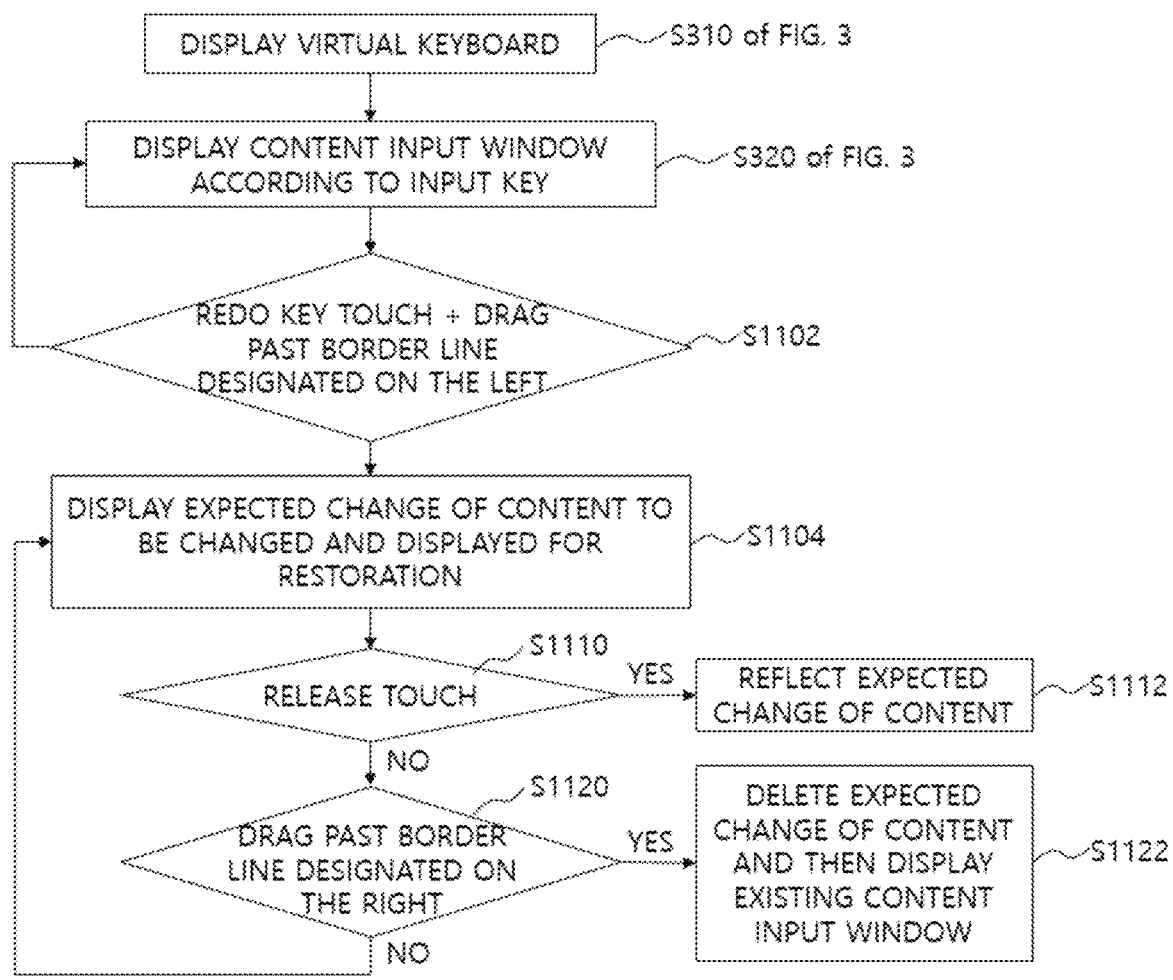
FIG. 11 is a flowchart for describing a method for controlling a mobile terminal related to a redo key, according to an embodiment of the disclosure.

FIG. 11 is a flowchart for describing a method for controlling a mobile terminal related to the redo key 421, according to an embodiment of the disclosure, and FIGS. 12 and 13 are diagrams for describing a case that the mobile terminal 100 detects touch and drag for the redo key 421, according to an embodiment of the disclosure.

In an embodiment of the disclosure, as for the redo key 421, an area extending by a designated distance is established as a redo key area 1210, and when the mobile terminal 100 detects a touch on the redo key area 1210, it may determine that a touch is made for the redo key 421, which is the same as what is described above about the undo key area 512 with reference to FIG. 5, so the overlapping description will not be repeated.

Furthermore, in describing embodiments of the disclosure with reference to FIGS. 11 to 13, the canceled task is assumed to be what is described above with reference to FIG. 10, i.e., three input words canceled and deleted.

Referring to FIGS. 11 to 13, when the mobile terminal 100 detects a touch 1301 in the redo key area 1210 and then detects a fourth drag, which is a drag past a fourth border line 1212 designated on one side of the redo key 421 to an arbitrary point 1302 in step S1102, the mobile terminal 100 may control the display 151 to display an expected change of content 1310 expected to be changed and displayed in the content input window to be identified in the content input window when the three words deleted right before by performing the canceling task in the content input window 420 is to be restored.

Subsequent steps S1110 to S1122 are the same as the steps S350 to S365 of FIG. 3 in that whether to reflect an expected change of content in the content input window is determined for display except the difference between the undo key 411 and the redo key 421, so the overlapping description will not be repeated.

According to embodiments of the disclosure with reference to FIGS. 1 to 13, it is seen that more convenient and efficient input means may be provided by having a virtual keyboard further equipped with the undo key 411 and the redo key 421.

In describing a mobile terminal and method for controlling the mobile terminal with reference to FIGS. 1 to 13, it will be obvious to those of ordinary skill in the art that the mobile terminal 100 may output sound, vibration, light, and the like as feedback through a means equipped in the output unit 150 (in FIG. 1) for the user when the mobile terminal 100 detects an input (e.g., a touch and/or a drag) from the user or outputs a certain result onto the display 151.

A method for controlling the mobile terminal 100 according to the aforementioned embodiments of the disclosure may be implemented as computer-readable codes on a computer-readable recoding medium. The computer-readable recording medium includes any type of recording medium having data stored thereon that may be read by a computer system. For example, it may be a read only memory (ROM), a random access memory (RAM), a magnetic tape, a magnetic disk, a flash memory, an optical data storage device, etc. The computer readable recording medium may also be distributed to computer systems over a computer communication network so that the computer-readable code is stored and executed in a distributed fashion.

While the disclosure has been shown and described with reference to certain exemplary embodiments thereof, it will be understood by those of ordinary skill in the art that various changes in form and details may be made therein without departing from the spirit and scope of the disclosure as defined by the appended claims and their equivalents.

The invention claimed is:

1. A mobile terminal comprising:
a display;
at least one sensor; and
a controller,
wherein the display is configured to display a virtual keyboard, and display a content entered by a user using the virtual keyboard on a content input window,
wherein the virtual keyboard includes an undo key for canceling a task performed in the content input window and a redo key for restoring a canceled task,
wherein when the at least one sensor detects a first drag past a first border line designated on a side of the undo key after a touch on the undo key, the controller is configured to display a first expected change of content expected to be changed and displayed in the content input window to be identified when one of tasks performed in the content input window is to be canceled in a designated unit, and
wherein when the at least one sensor detects a fourth drag past a fourth border line designated on a side of the redo key subsequent to a touch on the redo key, the controller is configured to display a fourth expected change of content expected to be changed and displayed in the content input window to be identified when one of canceling tasks is to be restored,
wherein when the at least one of the sensor detects a long touch, which is a touch of more than a designated time, subsequent to the first drag, the controller is configured to control the display to display a designated undo extension menu, and
wherein the undo extension menu comprises a plurality of numbers of tasks to be canceled.

2. The mobile terminal of claim 1, wherein when the at least one sensor detects a release of touch subsequent to the first drag, the controller is configured to reflect and display the first expected change of content in the content input window.

3. The mobile terminal of claim 1,
wherein when the at least one sensor additionally detects a second drag to select the number of tasks after the long touch, the controller is configured to select a certain number of tasks in the undo extension menu according to a displacement to the second drag after the long touch, control the display to display the selected number of tasks to be identified, and display a second expected change of content expected to be changed and displayed in the content input window to be identified when the selected number of tasks are canceled in a designated unit.

4. The mobile terminal of claim 3, wherein when the at least one sensor detects a release of touch subsequent to the second drag, the controller is configured to reflect and display the second expected change of content in the content input window.

5. The mobile terminal of claim 1, wherein when the at least one sensor detects a third drag past the first border line or a designated second border line when dragging is performed toward the undo key from a current touching point, the controller is configured to delete the first expected change of content from the content input window and display a content input window as before displaying the expected change of content.

6. The mobile terminal of claim 1, wherein when the at least one sensor detects a release of touch after the fourth drag, the controller is configured to reflect and display the fourth expected change of content in the content input window.

7. The mobile terminal of claim 1, wherein the controller is configured to establish areas extending by respectively designated distances from the undo key and the redo key as an undo key area and a redo key area, respectively, and when the at least one sensor detects a touch in each of the areas, the controller is configured to determine that a touch of a key corresponding to the touch area has occurred.

8. A method for controlling a mobile terminal, the method comprising:
(a) displaying a virtual keyboard on a display of the mobile terminal, and displaying a content entered by a user using the virtual keyboard in a content input window, wherein the virtual keyboard comprises an undo key for canceling a task performed in the content input window and a redo key for restoring a canceled task;
(b) when a first drag past a first border line designated on a side of the undo key subsequent to a touch on the undo key is detected, displaying a first expected change of content expected to be changed and displayed in the content input window to be identified when one of tasks performed in the content input window is to be canceled in a designated unit;
(c) when a release of touch is detected after the first drag, reflecting and displaying the first expected change of content in the content input window; and
(d) when a fourth drag past a fourth border line designated on a side of the redo key is detected after a touch on the redo key, displaying a fourth expected change of content expected to be changed and displayed in the content input window to be identified when one of canceled tasks performed in the content input window is to be restored,
wherein the step (b) comprises:
(b1) controlling the display to display a designated undo extension menu when a long touch, which is a touch of more than a designated time, is detected after the first drag, and
wherein the undo extension menu comprises a plurality of numbers of tasks to be canceled.

9. The method of claim 8, wherein the step (b1) is followed by
(b2) when a second drag to select a number of the tasks is additionally detected after the long touch, selecting a certain number of tasks in the undo extension menu according to a displacement to the second drag after the long touch, controlling the display to display the selected number of tasks to be identified, and displaying a second expected change of content expected to be changed and displayed in the content input window to be identified when the selected number of tasks are to be canceled in a designated unit.

10. The method of claim 9, wherein the step (b2) is followed by
- (b3) when a third drag past the first border line or a designated second border line is detected when dragging is performed toward the undo key from a current touching point, deleting the second expected change of content from the content input window and displaying a content input window as before displaying the second expected change of content.

11. The method of claim 8, further comprising:
- establishing areas extending by respectively designated distances from the undo key and the redo key as an undo key area and a redo key area, respectively, and determining that a touch of a key corresponding to the touch area has occurred when a touch in each of the areas is detected.

12. The method of claim 11, wherein the step (d) comprises
- when a release of touch is detected after the fourth drag, reflecting and displaying the fourth expected change of content in the content input window.

\* \* \* \* \*